July 15, 1969     H. M. LEWIS     3,455,236

MICROWEDGE ASSEMBLY

Filed Aug. 16, 1967     2 Sheets-Sheet 1

INVENTOR.
HARRY M. LEWIS
BY
Cushman, Darby & Cushman
ATTORNEYS

United States Patent Office 3,455,236
Patented July 15, 1969

3,455,236
MICROWEDGE ASSEMBLY
Harry M. Lewis, Springfield, N.J., assignor to Modern Engraving and Machine Corporation, Hillside, N.J., a corporation of New Jersey
Filed Aug. 16, 1967, Ser. No. 660,998
Int. Cl. B44b 5/00; B41f 13/24
U.S. Cl. 101—23          3 Claims

ABSTRACT OF THE DISCLOSURE

The embossing machine is provided with microwedge assemblies in the headstock and tailstock for holding the embossing rolls of the machine a desired distance apart. The wedges are intermediate the bearing boxes, which support the embossing rolls, and are controlled by a calibrated actuator to ensure the desired setting.

Brief description of the invention

The present invention relates to a microwedge assembly for holding the rolls of an embossing machine a desired distance apart.

The assembly, which is used in both the headstock and the tailstock, comprises a lower bearing box having an inclined upper surface, a spacer block secured to the upper surface of the lower bearing box, a wedge intermediate the spacer and the lower surface of the upper bearing box and means urging the lower bearing box toward the upper bearing box. A rod is nonrotatably secured to the wedge at one end and at the other end, is threadedly received in a spindle which is rotatably mounted in the headstock or tailstock. The spindle is held against axial movement so that rotation of the spindle moves the rod and, consequently, the wedge. The spindle has a calibrated face or dial which enables one to effect a precise axial movement of the rod and the wedge by turning the spindle to a desired position as indicated by the dial.

The microwedge assembly provides a means for quickly and accurately adjusting the embossing rolls relative to each other for different embossing operations.

The use of the spacing blocks in the assembly permits the assembly to be used with embossing rolls of various diameters.

Other advantages of the present invention will become more apparent from the following description when taken in combination with the accompanying drawings in which.

Detailed description of the invention

Figure 1:
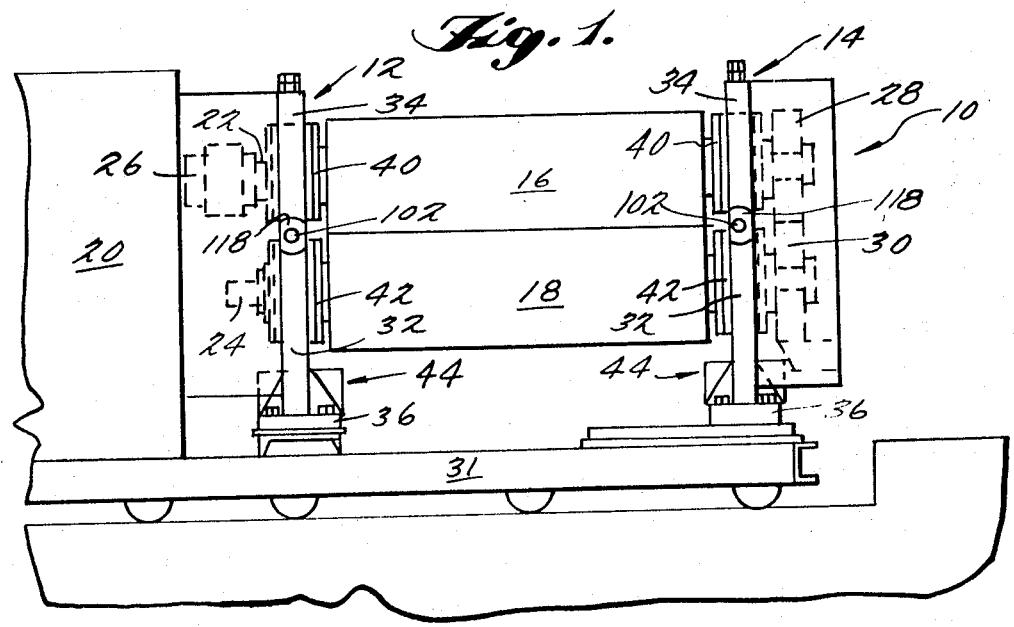
FIGURE 1 is an elevational view of the input side of the embossing machine showing the locations of the microwedge assemblies in the headstock and tailstock.

Referring to FIGURE 1, the embossing machine 10 comprises a headstock 12, a tailstock 14, embossing rolls 16, 18 and a drive unit 20.

The drive unit 20 is a conventional unit and is not shown in detail since the details of the drive unit neither comprise part of the invention nor would such details contribute to an understanding of the invention. The embossing rolls 16, 18 which are mounted on axles 22 and 24 respectively, are driven by drive shaft 26 of the driving unit 20 which is coupled to one end of axle 22. The other end of axle 22 is provided with a gear 28 that meshes with and drives gear 30 on the axle 24, thereby completing the drive train of the embossing machine.

Figure 2:
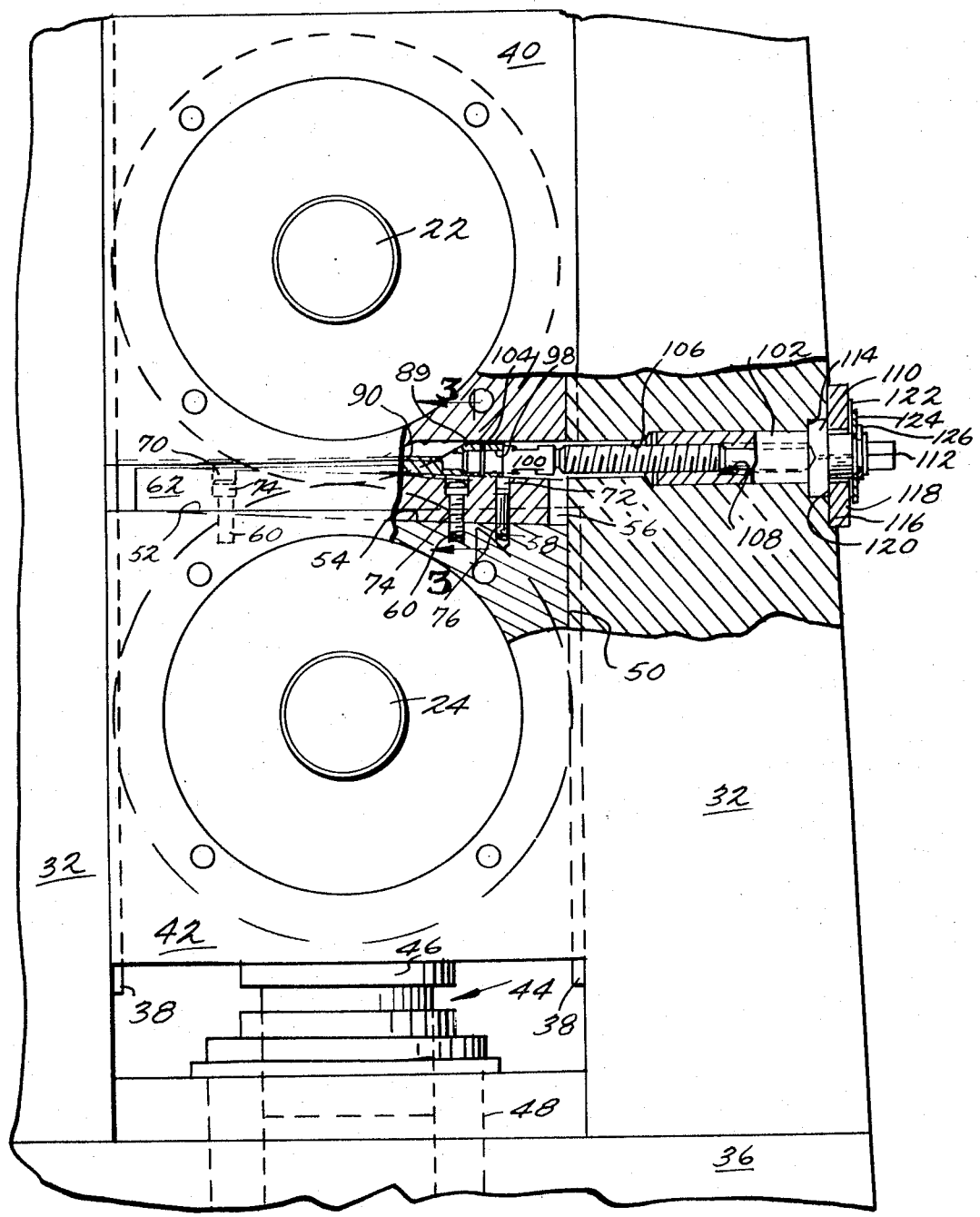
FIGURE 2 is a view partly in section of one of the stocks showing the microwedge assembly in greater detail.

The headstock 12 and tailstock 14 are both secured to a suitable base or carriage 31. As shown in FIGURES 1 and 2, the headstock 12 and tailstock 14 each comprise vertical spaced-apart frame members 32, upper horizontal frame members 34, which extend between and are bolted to the upper surfaces of the vertical spaced-apart frame members 32, and lower horizontal frame members 36, which extend between and are welded to the lower surfaces of the frame members 32. The vertical spaced-apart frame members 32 are each provided with elongated elements 38 which are welded, bolted or secured to frame members 32 in some other equivalent manner. These elongated elements cooperate with upper bearing boxes 40, which support axle 22, and lower bearing boxes 42, which support axle 24, as will be explained hereinafter.

The headstock 12 and the tailstock 14 are each provided with hydraulic piston and cylinder assemblies 44 having pistons 46 which engage the lower surfaces of bearing boxes 42 to urge the boxes upwardly. Pistons 46 are slidably and sealingly mounted in cylinders 48. The cylinders 48 are connected to a suitable supply of hydraulic fluid under pressure and are controlled by conventional valving means such as that illustrated in the patent to Sunderhauf et al., No. 2,662,002, issued Dec. 8, 1953.

In the preferred form of the invention, grooves 50 in the lateral surfaces of the lower bearing boxes 42 are slidably received on elongated elements 38, thereby slidably mounting the bearing boxes 42 on vertical frame members 32. The upper surface 52 of each bearing box 42 has an elongated central depression 54 extending in a direction perpendicular to the axes of the embossing rolls and inclined at a desired slope which can be .025 inch per inch. A pair of flanges 56, having their upper surfaces in a common horizontal plane, extend along either side of central depression 54. In addition, the upper surface 52 of each bearing box is provided with a locating aperture 58 and two threaded apertures 60 which are utilized to locate a spacing block 62 and secure the block to the upper surface 52 of the bearing box.

Matched pairs of spacing blocks 62 are utilized on the lower bearing boxes 42 in the headstock and tailstock to adapt the microwedge assemblies in the headstock and tailstock for use with a particular set of embossing rolls. Of course, the depth of the matched pairs of spacing blocks 62 is determined by the diameters of the embossing rolls being used with rolls 16, 18 of greater diameter requiring spacing blocks 62 of greater depth.

Each spacing block 62 has a lower protruding portion 64 with a planar surface 65 that is parallel to and rests on the inclined surface of depression 54. In addition, each block has an upper central depression 66 with a planar surface 68 that extends parallel to surface 65 of protruding portion 64. In this way, the slope of surface 68 is the same as the slope of the inclined surface of depression 54 for reasons as will be explained hereinafter. Spacing block 62 is also provided with apertures 70 and 72 which extend from surface 68 through protruding portion 64. Apertures 70 are counterbored and receive screws 74 which are threadedly secured in the threaded apertures 60 of the lower bearing box 42. Aperture 72 receives a pin 76 which extends into aperture 58 of the lower bearing box to ensure that the spacing block 62 is correctly positioned on the inclined surface of depression 54.

Spacing block 62 has lower and upper longitudinally-extending, horizontal surfaces 78, 80 respectively, on either side of protruding portion 64 and depression 66. When the block is in place, lower surfaces 78 engage the flanges 56 on the lower bearing box 42, while protruding portion 64 engages the inclined surface of depression 54. Upper surfaces 80 engage the lower surface 84 of bearing box 40 on either side of elongated depression 88 when wedge 86 is retracted to the right. Each bearing box 40 is mounted on elongated elements 38 and has its upper surface engaging an upper horizontal frame member 34, which prevents upward movement of the bearing box.

Wedge 86 is slidably mounted in depression 66 of the spacer block 62 and depression 88 in the lower surface of bearing box 40. Each wedge comprises a base portion 89, which is secured to an actuator spindle 102, and an extension 90 having a taper equal to the slope of the inclined surfaces of depressions 54 and 66. The extension 90 has an upper horizontally-extending surface 92 that contacts the complementary planar surface of depression 88. Since the slope of depression 66 equals the taper of wedge 86, and since bearing box 40 cannot move upwardly, wedge 86 moves in a horizontal plane altering the spacing between the embossing rolls 16, 18 by forcing the lower bearing box 42 away from the upper bearing box 40. Also, since the taper of the wedge 86 is the same as the slope of depressions 54 and 66, wedge 86 can be used without a spacing block 62, for embossing rolls of smaller diameters, with the wedge 86 being received in depression 54 of the lower bearing box 42 instead of depression 66 of the spacing block 62.

The base portion 89 of the wedge has a centrally located protruding portion 94 which is slidably received in a groove 96 that is located in depression 88 and extends part of the way across the lower surface of bearing box 40. The base portion 89 has a horizontally-extending aperture 98 therein, within which is mounted one end of rod 100. A pin 104 passes through rod 100 and base portion 89 to prevent axial or rotational movement of rod 100 relative to wedge 86.

Rod 100 extends outwardly from the base 89 and into a horizontally-extending aperture 106 extending through vertical frame member 32. The other end of rod 100 is threaded into the axially-extending threaded aperture 108 of spindle 102 which, in turn, is mounted in aperture 106.

Spindle 102, in addition to threaded aperture 108, has an annular flange 110 and an extension 112 which is adapted to be engaged by wrenches, sockets or other similar tools for turning the spindle 102. The spindle 102 is rotatably mounted in an enlarged portion of aperture 106 with the inner surface of annular flange 110 abutting surface 114 of the counterbore in aperture 106.

A machined portion forming a vertical surface 116 is provided on the outer sloping surface of the vertical frame members 32 adjacent aperture 106. Retaining ring 118 is bolted to this surface with the inner surface 120 of the ring slidably engaging the outer surface of annular flange 110, thereby retaining spindle 102 in aperture 106 so that the spindle cannot move axially.

Figure 4:
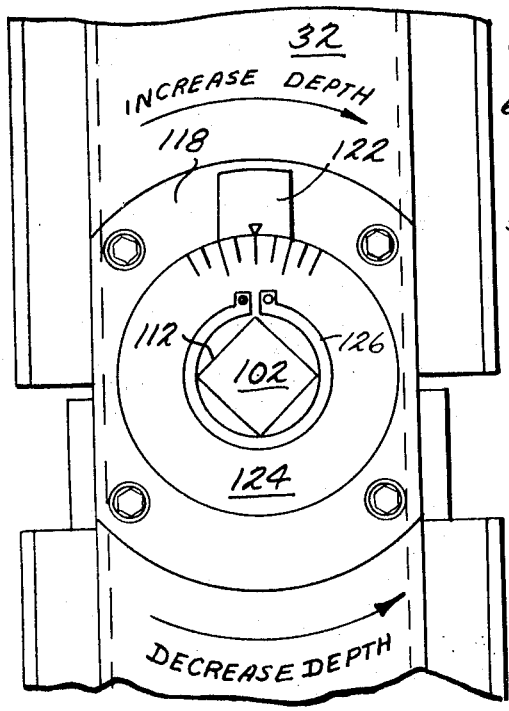
FIGURE 4 is an enlarged view of the calibrated dial of the microwedge assembly.
Figure 3:
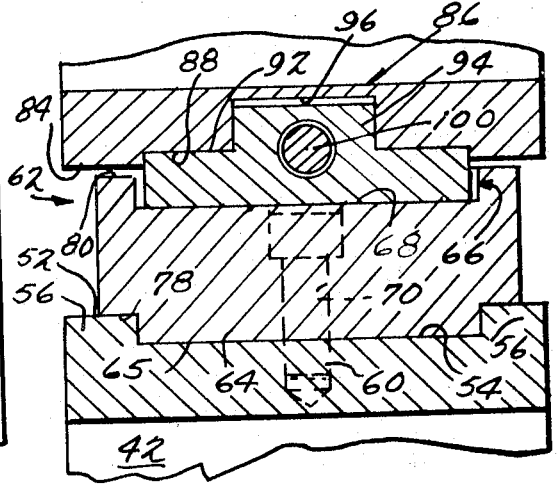
FIGURE 3 is a sectional view along lines 3—3 of FIGURE 2 showing a cross section of the microwedge assembly.

Referring to FIGURE 4, an indicator 122 is spot welded or otherwise rigidly affixed to the outer surface of retaining ring 118 and a dial 124 is rigidly affixed to spindle 102 by snap ring 126. In the preferred form, with a wedge taper of 0.25 inch per inch, one revolution of spindle 102 and, consequently, dial 124 equals .200 inch wedge movement of .005 inch bearing box and roll adjustment. There are fifty divisions on dial 124 with each division on the dial equaling .0001 inch vertical adjustment of the embossing rolls 16 and 18 relative to each other. Since, in the preferred form, the total vertical adjustment of the embossing rolls relative to each other is .125 inch, twenty-five revolutions of the spindle are required to adjust the spacing of the embossing rolls between the two extremes, thereby permitting very accurate adjustments of the embossing rolls relative to each other. Of course, the above embodiment is not to be construed as limiting the scope of the invention since it is contemplated that the amount of adjustment per revolution of the spindle, as well as the total adjustment effected by the microwedge assembly, can be altered to suit the requirements of the particular embossing machine and embossing operation.

In operation, bearing boxes 42, which support the lower embossing roll 18, are mounted on the headstock 12 and tailstock 14 and spacing blocks 62, if needed, are secured to the upper surfaces of the bearing boxes. Of course, if the diameters of the embossing rolls 16, 18 are small enough, no spacing blocks 62 are required. The microwedge 86 is then placed on the spacing block and connected to rod 100 which is threadedly mounted in spindle 102. Then, bearing boxes 40, which support the upper embossing roll 16, are mounted on the headstock and tailstock and upper horizontal frame members 34 are bolted to the upper ends of horizontal frame members 32, thereby preventing upward movement of bearing boxes 40.

The embossing rolls are adjusted to the proper position by means of spindle 102. The turning of the spindle clockwise causes wedge 86 to move to the left, thereby forcing the bearing boxes 40, 42 and, consequently, the embossing rolls 16, 18 apart. Counter-clockwise movement of the spindle moves the wedge 86 to the right enabling pistons 46 to urge the lower bearing boxes 42 upward toward the upper bearing boxes 40, thereby decreasing the spacing between the embossing rolls. Due to the calibrated dial and the small amount of movement imparted to the wedge by rotating the spindle, accurate adjustments between the embossing rolls can be obtained. In addition, while the spacing between the bearing boxes in the headstock and tailstock is controlled by independent microwedge assemblies, since the assemblies are identical, the adjustments at each end of the embossing rolls can be controlled so that the spacing between the bearing boxes in the headstock and tailstock is the same.

I claim:
1. A microwedge assembly for use on headstocks and tailstocks of embossing machines said assembly comprising:

an upper bearing box supporting one end of the axle of an embossing roll, said upper bearing box being mounted on one of the stocks of an embossing machine, and the lower surface of said upper bearing box having an elongated depression therein extending perpendicular to the axis of rotation of said embossing roll, a lower bearing box supporting one end of the axle of a second embossing roll, said lower bearing box being slidably mounted on said stock for movement in a vertical plane, and the upper surface of said lower bearing box having an elongated depression therein with an inclined surface extending perpendicular to the axis of rotation of said second embossing roll, means urging said lower bearing box upwardly toward said upper bearing box, a spacing block secured to the upper surface of said lower bearing box in a fixed position, said spacing block having a protruding portion which is received in said depression of said lower bearing box to insure the proper alignment of said spacing block, and the upper surface of said spacing block having a depression therein with an inclined surface extending parallel to the inclined surface of said depression in the lower bearing box, wedging means for holding said bearing boxes apart, said wedging means slidably mounted in said depression of said upper bearing box and said depression of said spacing block, means secured to said wedging means for effecting movement of said wedging means along said depressions in said upper bearing box and said spacing block to adjust said bearing boxes and thereby said embossing rolls relative to one another with movement of said wedging means in one direction forcing said lower bearing box away from said upper bearing box and with movement in the opposite direction permitting movement of the lower bearing box toward said upper bearing box.

2. In the microwedge assembly of claim 1: the taper of the wedging means being the same as the slope of the inclined surface of said depression in said spacing block.

3. In the microwedge assembly of claim 1: said means for effecting movement comprising a rod and a spindle, one end of said rod being nonrotatably secured to the wedging means and the other end of said rod being threadedly mounted in said spindle, and said spindle being retained in the stock by means which prevent axial movement of said spindle with the turning of said spindle effecting axial movement of said rod and said wedging means.

References Cited

UNITED STATES PATENTS

| | | | |
|---|---|---|---|
| 296,081 | 4/1884 | Steel | 308—59 X |
| 961,863 | 6/1910 | Johnson et al. | 101—23 |
| 2,949,851 | 8/1960 | Ghormley et al. | 101—248 |
| 2,957,409 | 10/1960 | Foulks | 101—23 |
| 3,256,812 | 6/1966 | Karrenbauer | 101—247 X |
| 3,306,188 | 2/1967 | Couzens et al. | 101—23 |

FOREIGN PATENTS 747,095   3/1956   Great Britain.

ROBERT E. PULFREY, Primary Examiner

C. D. CROWDER, Assistant Examiner

U.S. Cl. X.R.

100—168; 101—247